Inventors
Garrett P. Kelley
Henry J. Dallman
By Ira Milton Jones
Attorney

Inventors
Garrett P. Kelley
Henry J. Dallman
By [illegible]
Attorney

Inventors
Garrett P. Kelley
Henry J. Dallman
By [signature]
Attorney

Inventors
Garrett P. Kelley
Henry J. Dallman
By Ira Milton Jones
Attorney

ADJUSTABLE DOCKBOARD
Original Filed May 5, 1961
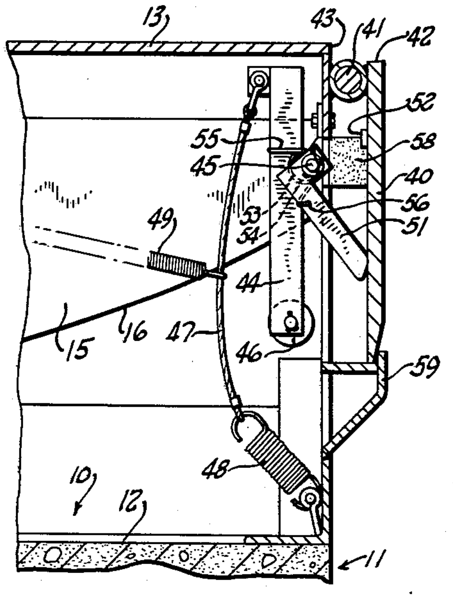
Fig. 5.
Fig. 6.
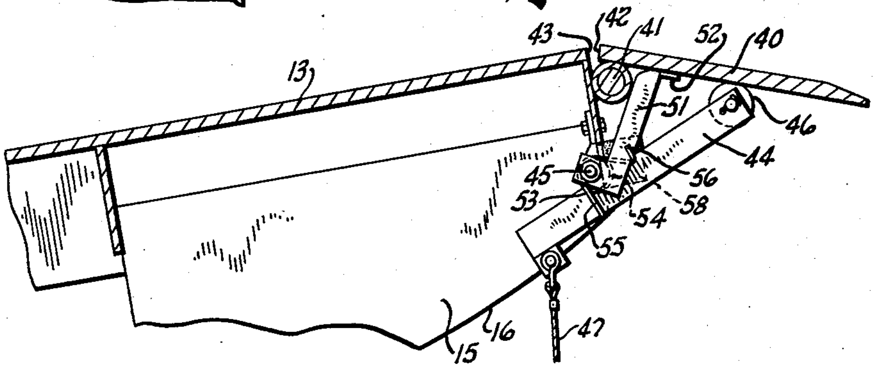
Fig. 7.
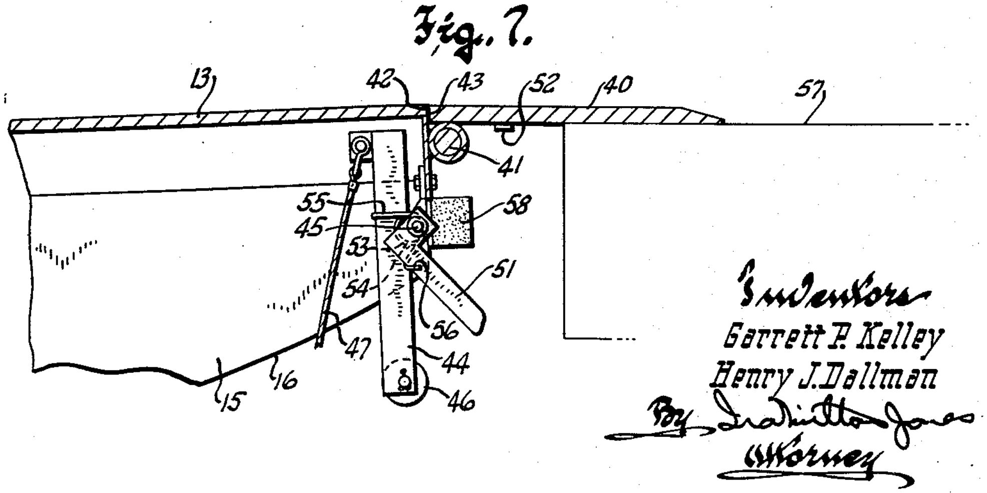
Inventors
Garrett P. Kelley
Henry J. Dallman
By [signature]
Attorney Inventors
Garrett P. Kelley
Henry J. Dallmen
By
Attorney 3,117,332
ADJUSTABLE DOCKBOARD Garrett P. Kelley, Fox Point, and Henry J. Dallman, Glendale, Wis., assignors to Kelley Company, Inc., Milwaukee, Wis., a corporation of Wisconsin Continuation of application Ser. No. 107,976, May 5, 1961. This application May 20, 1963, Ser. No. 281,838
9 Claims. (Cl. 14—71)

This invention relates to adjustable dockboards used to span the gap between a dock or loading platform and a carrier in loading or unloading position in front of the dock or platform, and constitutes an improvement upon the dockboard of the Kelley Patent No. 2,974,336. Moreover, this application is a continuation of Serial No. 107,976 filed May 5, 1961, and now abandoned.

The dockboard of this invention, like that of the aforesaid Kelley patent, consists generally of a ramp hingedly connected at its rear edge to the dock or, more accurately, to a stationary mounting structure or frame by which the unit is mounted in position on the dock, an extension lip hinged to the front edge of the ramp, spring means at all times tending to raise the ramp to an upwardly inclined position and capable of doing so when a hold-down device is released, and mechanism to lift the extension lip and to support the same until it comes to rest upon the bed of a carrier as the ramp is lowered.

However, in certain major respects, the present dockboard differs from that of the Kelley patent. Thus, with a view toward simplifying the preparation of the dockboard for use, this invention has as one of its objects to provide an improved way of lifting the extension lip and, more specifically, to provide means for lifting the extension lip automatically as the ramp swings up from its cross traffic position flush with the dock.

Another object of this invention is to provide an improved lip holding device to support the hinged lip in a definite partially lifted position, which is actuated in consequence of lip lifting movement of the means employed to automatically swing the lip to its lifted position, during the raising of the ramp.

Still another object of this invention is to improve the hold-down means by which the biasing means is restrained against raising the ramp, and more specifically, to provide a hold-down means which not only opposes the biasing means tending to raise the ramp and thus restrain the biasing means from raising the ramp from a position to which it has been lowered, but which overcomes the biasing means when necessary to keep the lip at the front edge of the ramp down on the bed of a carrier being loaded or unloaded, notwithstanding the inevitable changes, in the height of the carrier bed during such loading or unloading operations.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention, constructed according to the best mode so far devised for the practical application of the principles thereof, and in which:

FIGURE 5 is an enlarged detail view of the lip lifting and holding means, showing the same in the positions they occupy when the ramp is in its lowered cross traffic position seen in FIGURE 1;

FIGURE 6 is view similar to FIGURE 5, but with the parts in the positions shown in FIGURE 2;

FIGURE 7 is another view similar to FIGURE 5 but corresponding to FIGURE 3; and

Referring now particularly to the accompanying drawings in which like numerals refer to like parts in the several views, the numeral 10 designates generally the stationary mounting structure or frame of the dockboard by which the entire unit is mounted upon a dock or platform indicated generally by the numeral 11.

Figure 1:
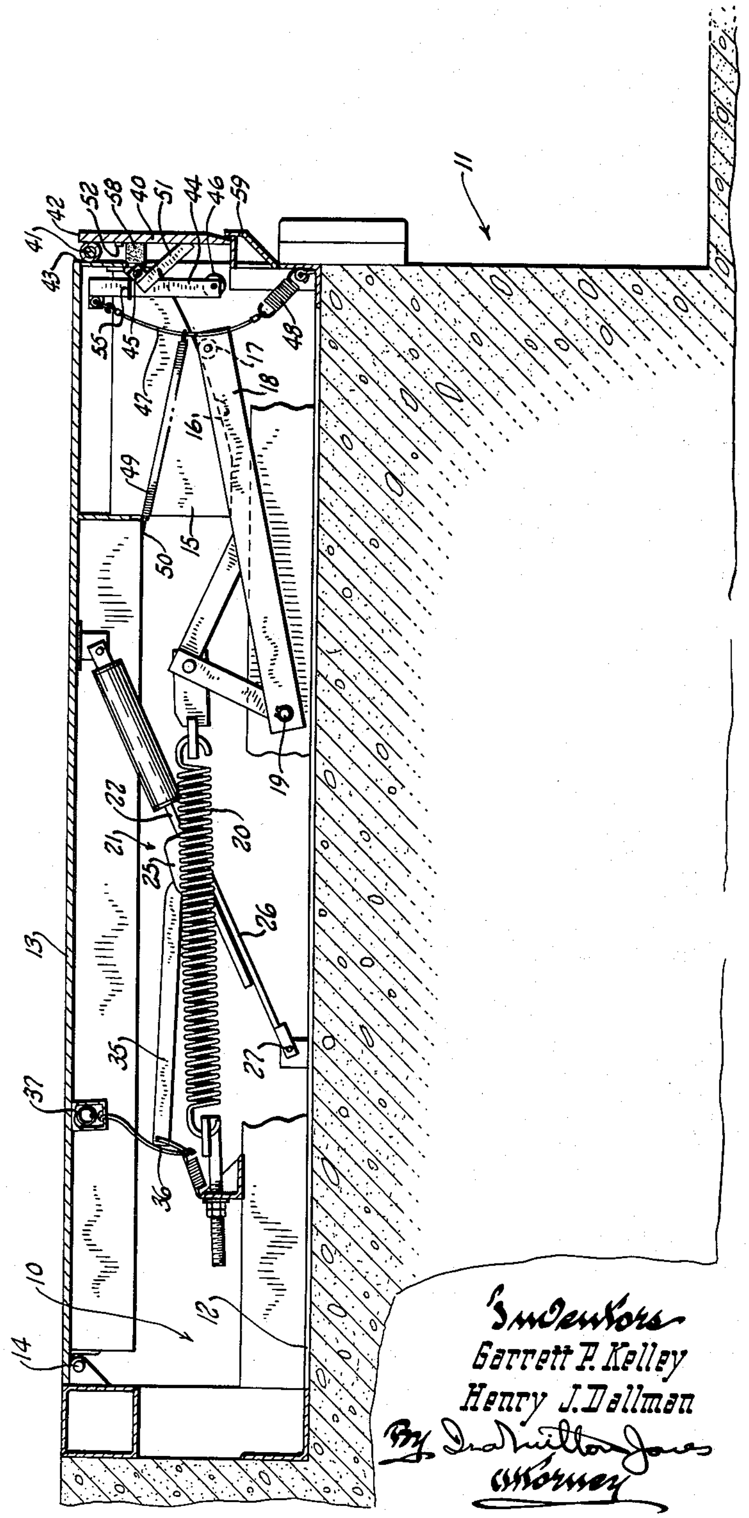
FIGURE 1 is a cross sectional view through a dock with the dockboard of this invention mounted thereon and showing the ramp in its cross traffic position.

Ordinarily, the entire dockboard unit is mounted in a shallow depression or pocket 12 in the dock or platform, with the front of the frame flush with the front of the dock or platform, and the top thereof so positioned that a ramp 13 having its rear edge hinged to the frame as at 14, is flush with the top of the dock when in its normal cross traffic position shown in FIGURE 1. Obviously, the ramp should be of size to close the depression or pocket 12 when in its horizontal cross traffic position.

The ramp preferred consists of a steel plate secured to the top of a suitable frame structure, from the underside of which a cam plate 15 projects downwardly. The lower edge of the cam plate provides a curved cam track 16 against which a roller 17 at the outer free end of an arm 18 bears. The arm 18 is pivoted as at 19 to the frame 10 and upon being swung about its pivot carries the roller 17 in an upwardly extending arc and causes it to ride along the cam track and thereby elevate or raise the ramp about its hinged mounting 14, the curvature of the cam track multiplying the vertical component of the bodily motion of the roller 17.

Figure 2:
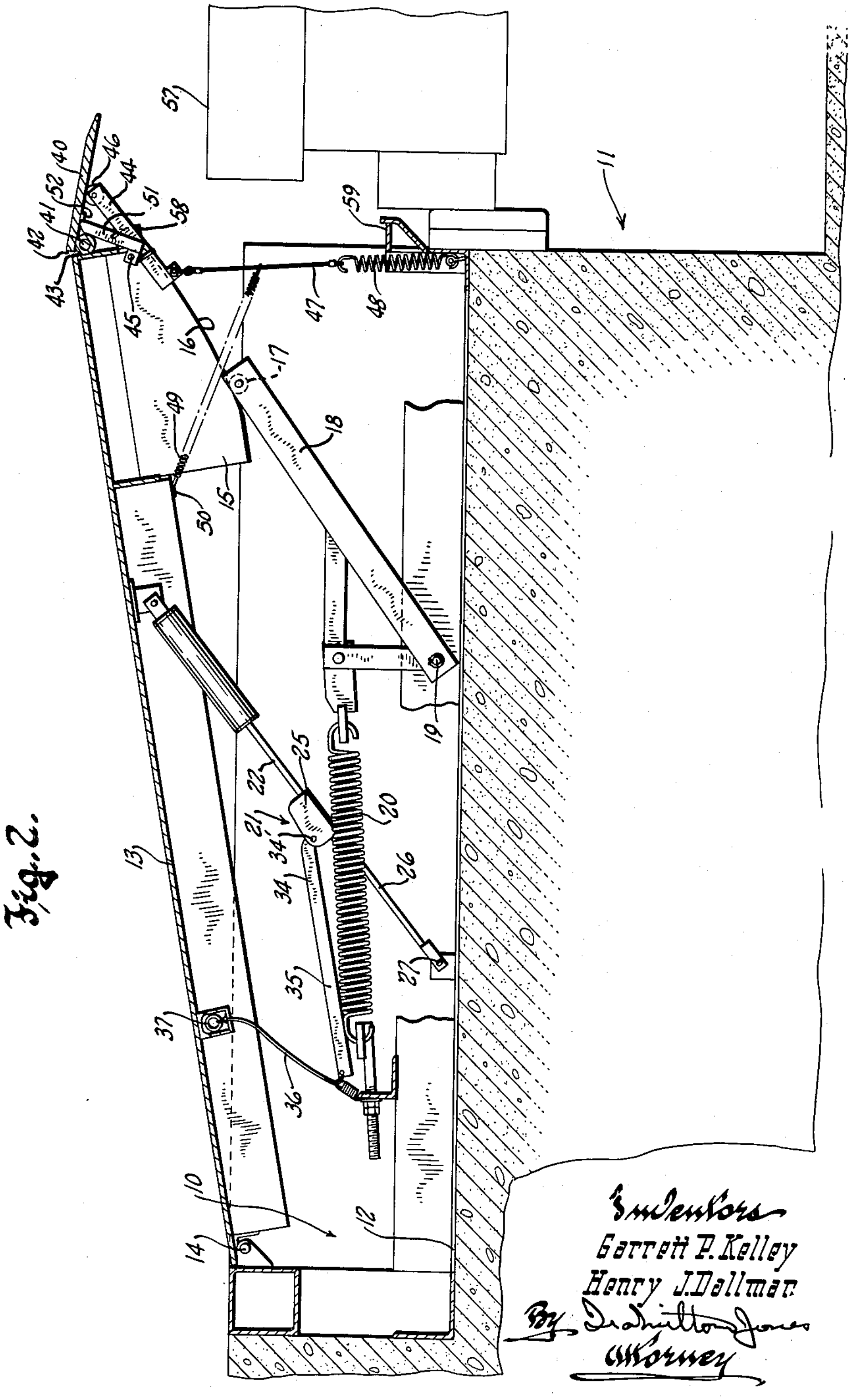
FIGURE 2 is a view similar to FIGURE 1 but showing the ramp in its fully raised position and the hinged extension lip in its partially lifted position so as to come to rest upon the bed of the carrier, as the ramp is lowered.
Figure 3:
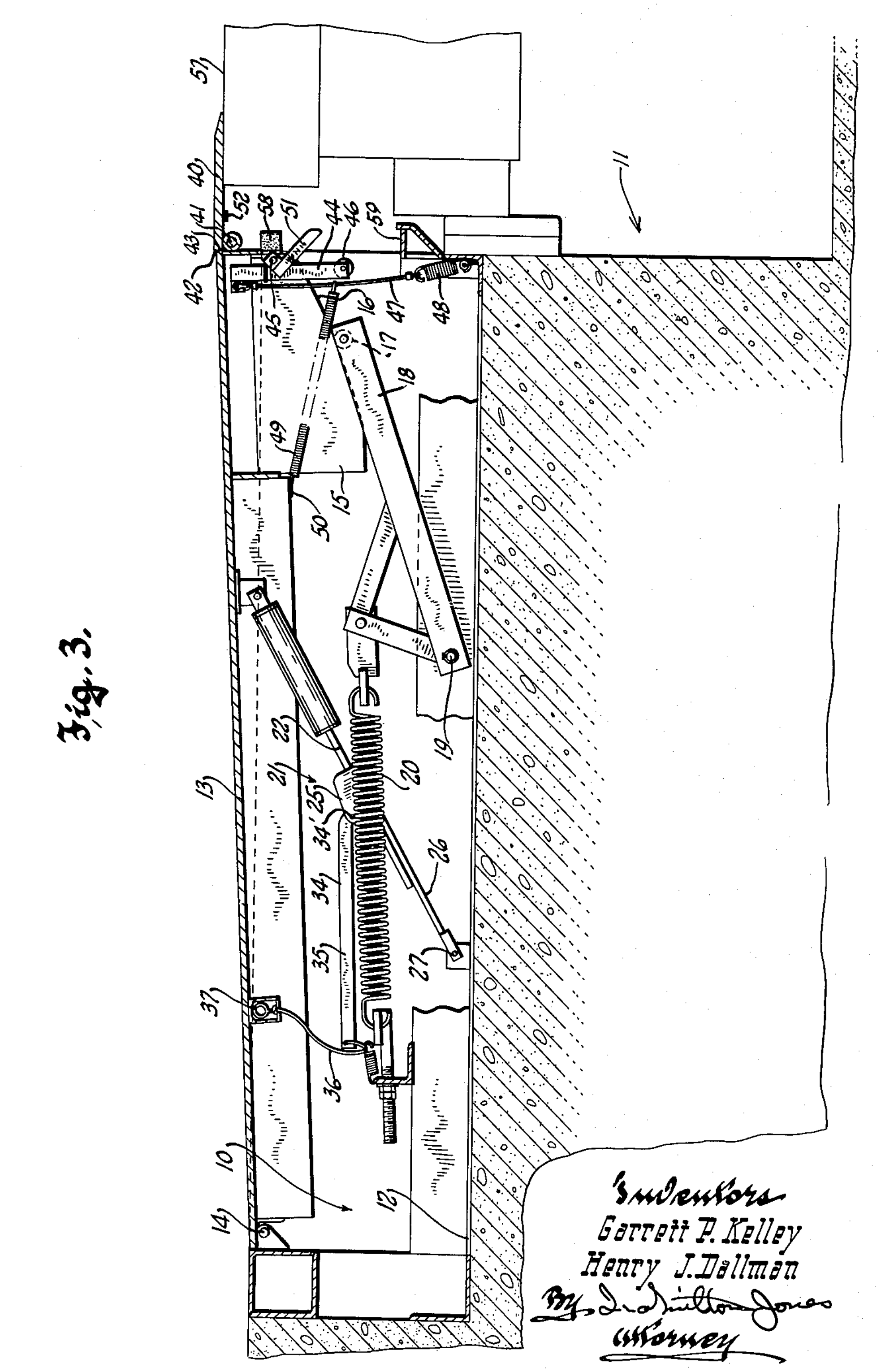
FIGURE 3 is again like FIGURE 1 but showing the ramp and the extension lip in position for loading or unloading of the carrier.
Figure 4:
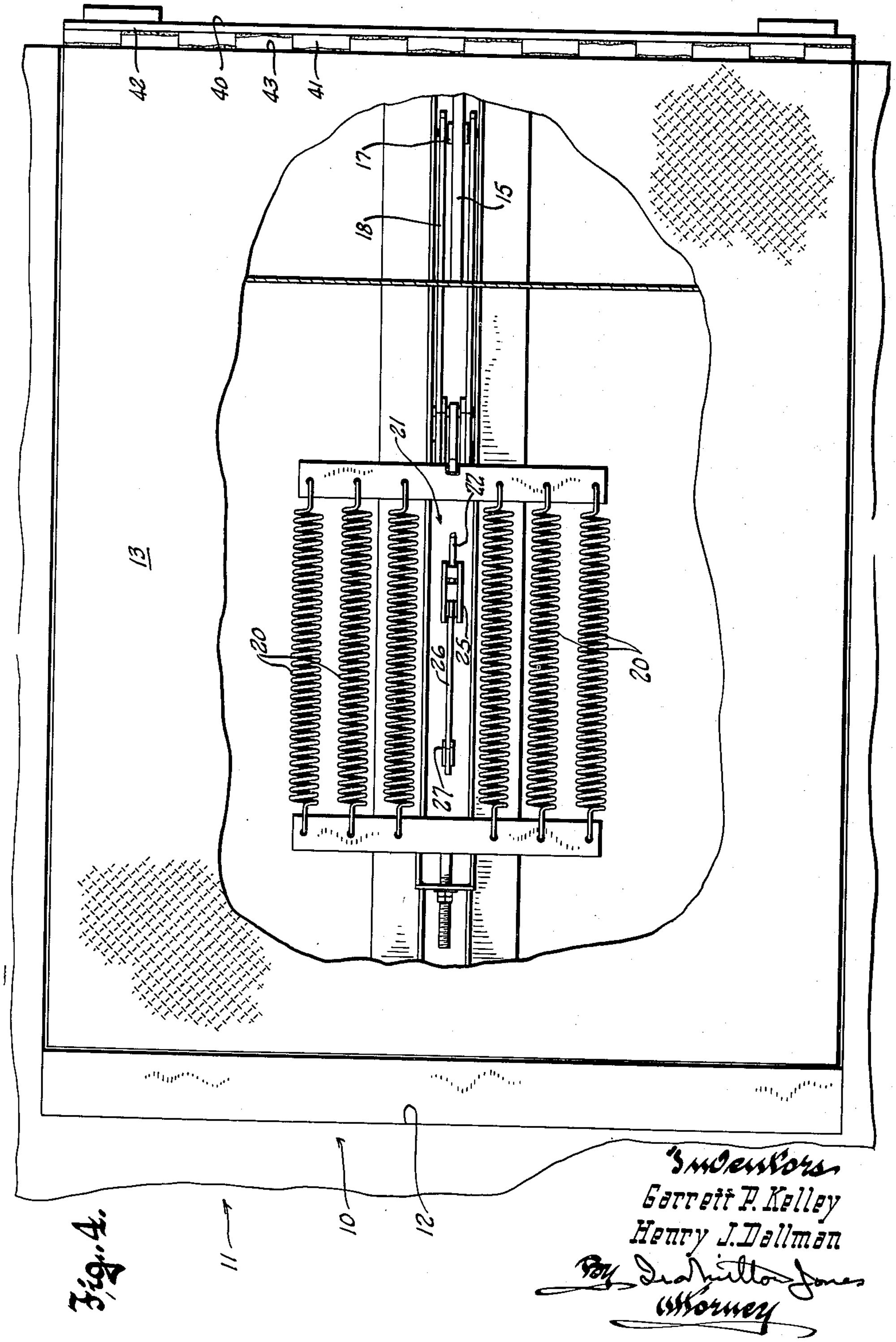
FIGURE 4 is a plan view of the entire unit with parts broken away to better illustrate the various details of the more important parts of the structure.
Figure 8:
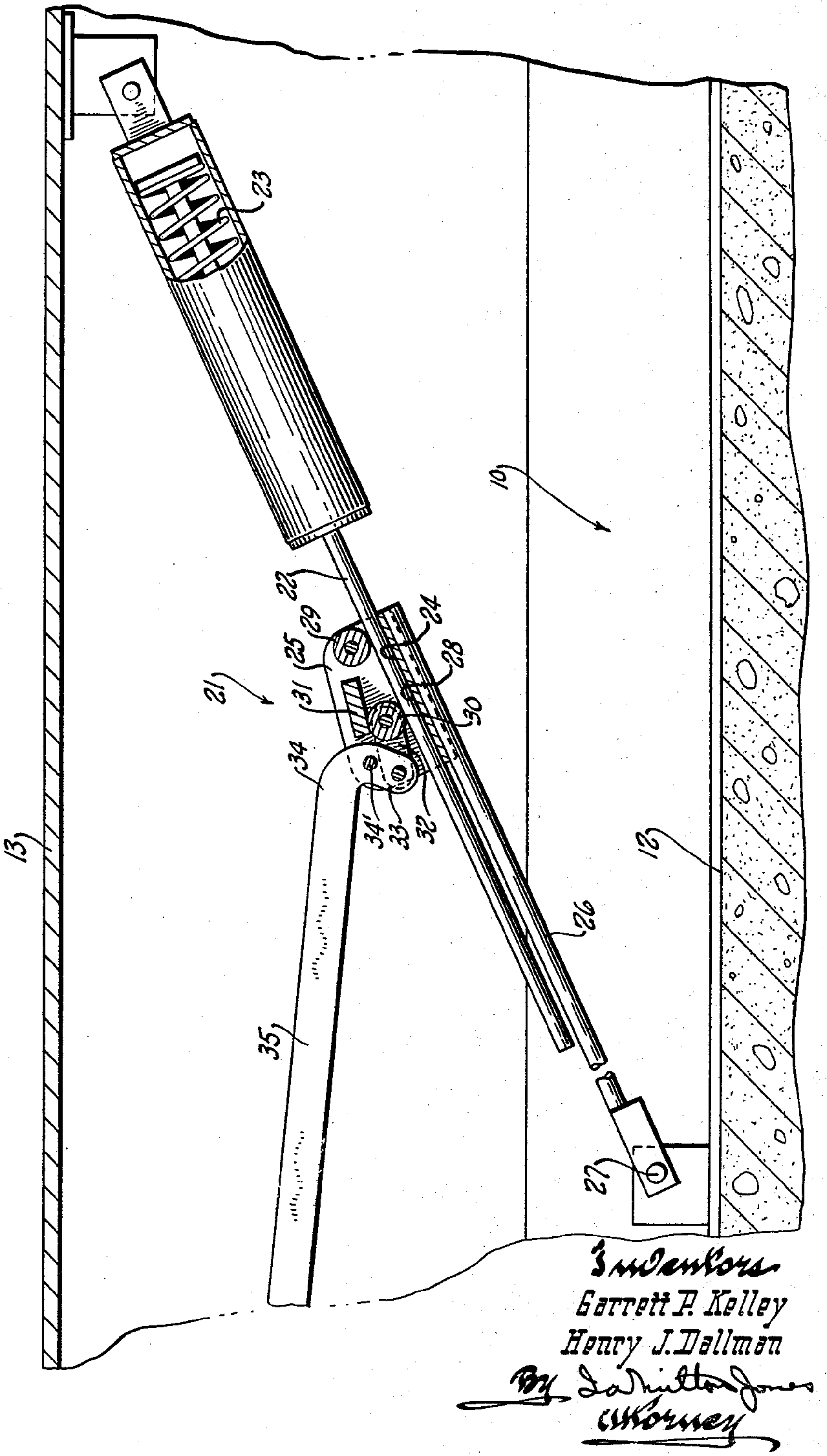
FIGURE 8 is an enlarged detail view of the hold-down mechanism by which the ramp is releasably held against elevation.

A plurality of heavy tension springs 20 are connected between the arm 18 and the frame 10 to at all times bias the arm 18 in a direction to raise the ramp. The springs 20 are sufficiently strong to assure that, when unrestrained they will raise the ramp to a substantial angle above dock level, as shown in FIGURE 2; but normally these springs are restrained against raising the ramp, by a releasable hold-down device indicated generally by the numeral 21.

The hold-down device is connected between the ramp and the frame 10, and comprises a rod 22 which may be a length of bar stock hingedly connected through a heavy compression spring 23 with the underside of the ramp, so that except when the spring 23 yields (as will be hereinafter described) the rod 22 moves endwise as the ramp is raised or lowered.

The rod 22 is slidably received in a slideway 24 so as to slide therethrough as the ramp is raised and lowered. The slideway 24 comprises a housing fixed to the end of a second rod 26 which in turn is pivoted to the frame, as at 27.

The housing 25 is U-shaped in cross section and has the rod 22 slidably received between its flanges in sliding engagement with its flat bottom 28 where it is loosely held by a guide roller 29. A second locking roller 30 is adapted to be wedged between the top of the rod 22 and an inclined cam 31 which is fixed to and spans the distance between the flanges of the housing.

The direction the cam 31 is inclined is such that during endwise movement of the rod 22 into the housing 25 as the ramp is lowered, the locking roller 30 moves out of its operative holding position, while upon initial endwise separation of the rods the roller 30 becomes wedged between the cam and the rod 22 and hence holds the ramp against being raised by the springs 20 until the roller 30 is withdrawn from its operative position.

To releasably maintain the roller 30 in its operative position and also enable it to be retracted therefrom, it is connected by means of a pair of links 32 with one arm 33 of a bell crank lever 34, pivoted as at 34' to the housing 25. The other and much longer arm 35 occupies a substantially horizontal position beneath the ramp and by its weight alone biases the roller toward its operative position. An upward pull on the arm 35 withdraws the locking roller from gripping engagement with the rod 22 and thus releases the locking device and allows the ramp to be raised by its springs 20. Any suitable means may be provided to pull the arm up, as for instance, a cable 36 provided with a finger ring 37 which normally occupies a pocket in the top of the ramp.

An extension lip 40 is hinged to the front edge of the ramp, as at 41, to be movable from a pendent position hanging down in front of the ramp to a defined operative position forming an extension of the ramp. The definition of its operative position is obtained by the abutment of the hinged edge 42 of the lip with the extreme front edge 43 of the ramp.

The extension lip 40 is automatically lifted to its defined operative position in consequence of raising of the ramp 13 by means of a lip lifting arm or lever 44 which is medially pivoted to the front edge portion of the ramp, as at 45. Normally the arm or lever 44 hangs in a vertical inoperative position, and at its lower end it mounts a roller 46 which engages the underside of the hinged lip as the arm or lever 44 is swung on its pivot to lift the lip.

The opposite or normally upper end of the arm or lever 44 has one end of a cable or other suitable tension member 47 attached to it, the other end of this tension member being connected to the stationary frame 10, preferably by means of a tension spring 48. When the ramp is in its normal horizontal cross traffic position the cable or tension member 47 is slack, and to assure that the slack cable will not become entangled with any of the mechanism beneath the ramp, a take-up spring 49 is connected between the medial portion of the cable and the underside of the ramp, as at 50.

The cable or tension member 47 is of such length that during raising of the ramp (upon release of the hold-down device 21) the cable becomes taut and pulls down the upper end of the arm or lever 44, swinging its lower end and the roller 46 thereon against the underside of the hinged lip, to swing or lift the same to a predetermined position short of its defined operative position, as shown in FIGURES 2 and 5.

Simultaneously with the lip lifting actuation of the arm or lever 44, a lip holder 51 swings out into operative position engaging the underside of the hinged lip behind an abutment or lug 52 thereon, to support the hinged lip independently of the arm 44. The lip holder 51 is a lever or arm hinged to the front edge portion of the ramp, preferably coaxially with the pivot 45 of the arm 44. If unrestrained, the lip holder 51 would hang substantially vertically from its pivotal connection with the ramp, but a torsion spring 53 having its coil 54 encircling the pivot 45, one leg 55 bearing against the rear edge of the lip lifting arm 44 above the pivot 45, and its other leg 56 bearing against the rear edge of the lip holder, biases the lip holder forwardly and into engagement with the extension lip when the ramp is in its lowered cross traffic position and the hinged lip is in its pendent position, as seen in FIGURES 1 and 5.

As will be apparent, when the lip lifting arm 44 is swung about its pivot 45 as a consequence of raising of the ramp, the counter clockwise rotation of the arm 44 (as viewed in the drawings) acting through the torsion spring 53, swings the lip holder 51 to its operative position behind the abutment or lug 52 at the underside of the lip. Because of this interrelated functioning of the lip lifting arm 44 and the lip holder 51, these two devices together may be considered lip lifting and holding means.

With the lip holder 51 in its operative lip supporting position, the ramp may be lowered, and despite the fact that with such lowering of the ramp the lip lifting arm 44 returns to its pendent inoperative position, and hence is out of engagement with the lip, the lip remains in its aforesaid predetermined position short of its defined operative position being held or supported in this position by the lip holder 51. Consequently, as the ramp is lowered, which may be done by simply walking out onto it, the lip comes to rest upon the bed of a carrier 57 in position in front of the dockboard. With continued lowering of the ramp, the lip (now supported by the bed of the carrier) moves upwardly with respect to the ramp to its defined operative position substantially flush with the ramp and, in so doing, becomes disengaged from the holder 51 which then drops into engagement with the leg 56 of the torsion spring.

As will be evident from FIGURE 6, when the weight of the lip is borne solely by the lip holder 51, as is the case after the ramp is lowered and the lip lifting arm 44 has dropped to its inoperative position, and before the lip comes to rest upon the bed of a carrier, the force applied to the lip holder by the weight of the lip imparts very little, if any, turning moment upon the lip holder. Hence, the friction between the end of the lip holder and the underside of the lip alone is ordinarily sufficient to maintain the lip holder in its operative position, the abutment 52 being provided merely as an added safety measure.

Since the hold-down mechanism 21 restrains the springs 20 from raising the ramp, the ramp is now in condition to be used in loading or unloading the carrier. During the loading and unloading operation the height of the carrier bed will vary. Thus, as a load is moved across the ramp and onto the carrier, the rear springs of the carrier yield and allow the carrier bed to descend, and as it does the ramp and its extension lip simply move down with it due to the weight of the load moving thereacross. As this load is moved toward the front of the carrier so that the weight on its rear spring becomes less, these springs restore the rear end portion of the carrier bed to its previous height, or close to it. As this happens the spring 23 yields (is compressed) to allow the ramp to rise with the carrier bed.

As the material handling truck is driven back toward the rear of the carrier, the bed of the carrier again descends, but unless the biasing means (springs 20) tending to hold the ramp up is overcome in some way, the ramp will not follow the descent of the carrier bed. It is here that the spring 23 comes into play. This spring is, of course, pre-loaded, but in yielding to allow the ramp to rise with the rising carrier bed, the energy stored in the spring 23 is increased to the point where it readily overcomes the upward bias imparted to the ramp by the springs 20 and, in so doing, holds the ramp down on the carrier bed. The spring 23 of the hold-down means in cooperation with the restraint which the hold-down means imposes upon the springs 20, thus causes the ramp to float up and down with the carrier bed as the carrier is loaded or unloaded.

Upon completion of the loading or unloading operation as the case may be, the carrier pulls away and the hinged extension lip drops to its pendent position and, in doing so, comes to bear against the lip holder 51, which however does not prevent the lip from assuming its fully pendent vertical position. Rubber bumpers 58 are preferably mounted on the front of the ramp to cushion the "fall" of the lip.

If the ramp was above dock level during the loading or unloading operation, it is lowered to dock level by again simply walking out onto it, whereupon the lower free edge of the hinged extension lip comes to rest upon a pair of brackets 59 mounted on the front end of the stationary mounting frame to solidly support the ramp in its cross traffic position flush with the dock.

If the ramp was below dock level at completion of the loading or unloading operation, the hold-down device 21 should be released to permit the springs 20 to raise the ramp slightly above dock level, so that the free edge of the hinged lip may swing to its fully pendent position above the brackets 59. This done, the ramp is again simply lowered to bring the free edge of the lip into supporting engagement with the brackets 59.

From the foregoing description taken in connection with the accompanying drawings, it will be readily apparent to those skilled in this art that this invention provides an improved adjustable dockboard in which the extension lip hinged to the front edge of the ramp is automatically lifted as the ramp is raised, in which the extension lip is supported in a predetermined position short of its defined operative position by a lip holder which in turn is controlled by the means employed to automatically lift the extension lip, and in which the ramp floats up and down with the changing height of the carrier bed during loading or unloading of the carrier. It will also be seen that the means employed in this invention to achieve these objectives are practicable and reliable in operation.

What is claimed as our invention is:

1. In an adjustable dockboard having a stationary mounting structure, a ramp with front and rear edges, means hingedly connecting the rear edge portion of the ramp with the mounting structure so that the ramp may swing up and down about a horizontal axis, and means operatively connected with the ramp to raise the ramp, the improvement which comprises: a lip hinged to the front edge of the ramp and swingable about its hinge axis from a pendent position hanging down in front of the ramp to a defined operative position at which the lip forms an extension of the ramp; lip lifting means carried by the ramp and operable upon actuation thereof to lift the lip to a predetermined position short of its defined operative position, said lip lifting means being biased to an inoperative position; means connected with the lip lifting means and activated by upward motion of the ramp to actuate the lip lifting means, so that the lip is automatically swung to a position short of its defined position as the ramp is raised; a lip holder mounted on the ramp and movable between an inoperative position in which it does not interfere with the lip occupying its pendent position, to an operative position at which it supports the lip in a lifted position short of its defined operative position as long as the weight of the lip is borne by the lip holder, the lip holder being biased to its inoperative position; and means responsive to actuation of the lip lifting means to effect movement of the lip holder to its operative position as the lip lifting means is actuated to lift the lip, said last named means being rendered ineffective to maintain the lip holder in its operative lip supporting position by return of the lip lifting means to its inoperative position so that upon lowering of the ramp and removal of the weight of the lip on the lip holder as a result of the lip being lifted beyond said position short of its defined operative position, the lip holder returns to its inoperative position.

2. In an adjustable dockboard having a stationary mounting structure, a ramp member with front and rear edges, means hingedly connecting the rear edge portion of the ramp member with the mounting structure so that the ramp member may swing about a horizontal axis, and means operatively connected with the ramp member to raise the same, the improvement which comprises: a lip member hinged to the front edge of the ramp member and swingable about its hinged axis from a pendent position hanging down in front of the ramp member to a defined operative position at which the lip member is elevated and forms an extension of the ramp member; cooperating means on said members to define the operative position of the lip member by engaging one another and precluding further upward swinging movement of the lip member with respect to the ramp member; lip lifting means carried by the ramp member and operative to swing the lip member toward its defined operative position; means connected with the lip lifting means and the stationary mounting structure to actuate the lip lifting means and effect movement of the lip member toward its defined operative position as a consequence of raising of the ramp member; a lip holder movably mounted on the ramp member for movement from an inoperative position to an operative position supporting the lip member in a predetermined raised position short of its defined operative position, without interfering with further upward swinging movement of the lip member to its defined operative position, the lip holder being biased to its inoperative position so that it returns thereto automatically upon being relieved of the weight of the lip member thereon in consequence of the lip member moving to its defined operative position as the ramp member is lowered from a raised position and the lip member comes to rest upon a carrier in front of the dockboard; and means reacting between the lip holder and the lip lifting means to move the lip holder into operative lip holding position in consequence of lip lifting actuation of the lip lifting means, without interfering with return of the lip lifting means to inoperative condition as the ramp member is lowered.

3. In an adjustable dockboard, the structure set forth in claim 2, wherein the lip lifting means is an arm pivoted to the front edge portion of the ramp member with one end thereof swingable into lifting engagement with the hinged lip; and the means to actuate the lip lifting means comprises a tension member having one end connected to the stationary mounting structure, and having its other end operatively connected with the arm to swing the same about its pivot as the tension member is drawn taut.

4. In an adjustable dockboard, the structure set forth in claim 3, further characterized by the fact that the lip holder is a lever pivoted to the front edge portion of the ramp member adjacent to the lip lifting arm; and wherein said biasing means is a torsion spring having coils encircling the pivot axis of the lip holder and ends bearing against said arm.

5. In an adjustable dockboard, the structure set forth in claim 4, wherein said lever and said arm swing about a common axis.

6. In an adjustable dockboard having a stationary mounting structure, a ramp with front and rear edges, means hingedly connecting the rear edge portion of the ramp with the mounting structure so that the ramp may swing up and down about a horizontal axis, ramp biasing means reacting between the mounting structure and the ramp and tending at all times to raise the ramp, and releasable holding means acting in opposition to the ramp biasing means to restrain the same from raising the ramp until the holding means is released, the improvement which resides in the fact that said releasable holding means comprises: a pair of solid rods; a slideway fixed to one end portion of one of the rods and in which one end portion of the other rod is slidably received; cam means fixed in the slideway having an inclined surface facing the portion of said other rod which is in the slideway; a locking member in the slideway movable to and from an operative position wedged between said inclined cam surface and the adjacent portion of said other rod to secure the rods against relative endwise separation while permitting relative endwise movement thereof towards one another; means biasing the locking member toward its operative position; means pivotally connecting the opposite end of one of the rods with the stationary mounting structure, and pivotal means connecting the opposite end of the other rod with the ramp so that elevation of the ramp by the ramp biasing means entails endwise separation of the rods, while descent of the ramp in opposition to its biasing means entails endwise movement of the rods towards one another; one of said last named means including a spring through which the holding means applies its restraint upon the ramp biasing means and which yields to permit limited ascent of the ramp by an external force greater than that of the ramp biasing means; and manually operable means to withdraw the locking member from its operative position and thereby free the ramp for elevation by the ramp biasing means.

7. In an adjustable dockboard having a stationary mounting structure, a ramp member with front and rear edges, means hingedly connecting the rear edge portion of the ramp member with the mounting structure so that the ramp member may swing about a horizontal axis, and means operatively connected with the ramp member to raise the same, the improvement which comprises: a lip member hinged to the front edge of the ramp member and swingable about its hinge axis from a pendent position hanging down in front of the ramp member to a defined operative position at which the lip member is elevated and forms an extension of the ramp member adapted to rest upon a carrier in front of the dockboard; cooperating means on said members to define the operative position of the lip member by engaging one another and precluding further upward swinging movement of the lip member with respect to the ramp member; lip lifting and holding means arranged to react between said members and operative to swing the lip member toward its defined operative position and to support the lip member in a predetermined raised position short of its defined operative position as long as the weight of the lip member is borne by any part of said means, without interfering with further upward swinging movement of the lip member to its defined operative position, such further upward movement of the lip member removing the weight thereof from the lip lifting and holding means; and actuating instrumentalities operatively connected with the lip lifting and holding means to move said means in consequence of upward movement of the ramp member about its hinged connection with the stationary mounting structure, and thereby elevate the lip member and cause the same to be held in said predetermined position short of its operative position as the ramp member rises; the lip lifting and holding means being biased to an inoperative condition so that upon lowering of the ramp member from a raised position and removal of the weight of the lip member from the lip lifting and holding means, the lip member is free to return to its pendent position as a carrier upon which the lip member rested pulls away.

8. The dockboard of claim 7, wherein said actuating instrumentalities include a tension member having one end anchored with respect to the stationary mounting structure and its other end operatively connected with the lip lifting and holding means to be placed in tension as the ramp member swings upwardly and to thereby activate said instrumentalities.

9. In an adjustable dockboard having stationary mounting structure, a ramp member with front and rear edges, means hingedly connecting the rear edge portion of the ramp member with the mounting structure so that the ramp member may swing about a horizontal axis, and means operatively connected with the ramp member, to raise the same, the improvement which comprises:

a lip member hinged to the front edge of the ramp member and swingable about its hinge axis from a pendent position hanging down in front of the ramp member to a defined operative position at which the lip member is elevated and forms an extension of the ramp member;

cooperating means on said members to define the operative position of the lip member by engaging one another and precluding further upward swinging movement of the lip member with respect to the ramp member;

lip lifting means carried by one of said members and movable to swing the lip member toward its defined operative position;

a tension member having one end anchored with respect to the stationary mounting structure and its other end connected with the lip lifting means to be placed in tension as the ramp member swings upwardly, and to thereby move the lip lifting means and cause the same to lift the lip member;

a lip holder movably mounted on one of said members for movement from an inoperative position to an operative position reacting between said members and supporting the lip member in a predetermined raised position in which the lip member will seat upon the bed of a carrier in front of the dockboard as the ramp member is lowered from a raised position with the lip member thus supported; and spring means acting on the lip holder, and operable during movement of the lip lifting means to elevate the lip member, to move the lip holder to its operative position.

References Cited in the file of this patent

UNITED STATES PATENTS

| | | |
|---|---|---|
| 2,714,735 | Watson | Aug. 9, 1955 |
| 2,974,336 | Kelley | Mar. 14, 1961 |

Disclaimer 3,117,332.—*Garrett P. Kelley*, Fox Point, and *Henry J. Dallman*, Glendale, Wis. ADJUSTABLE DOCKBOARD. Patent dated Jan. 14, 1964. Disclaimer filed Aug. 28, 1964, by the assignee, *Kelley Company, Inc.*

Hereby enters this disclaimer to claim 6 of said patent.

[*Official Gazette November 17, 1964.*]